F. P. CANFIELD.
Brake for Elevators.
No. 9,584.
Reissued Feb. 22, 1881.
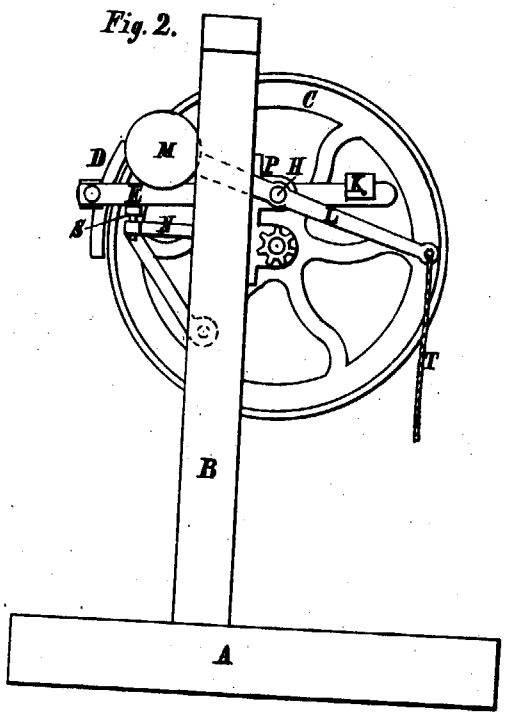
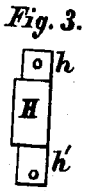
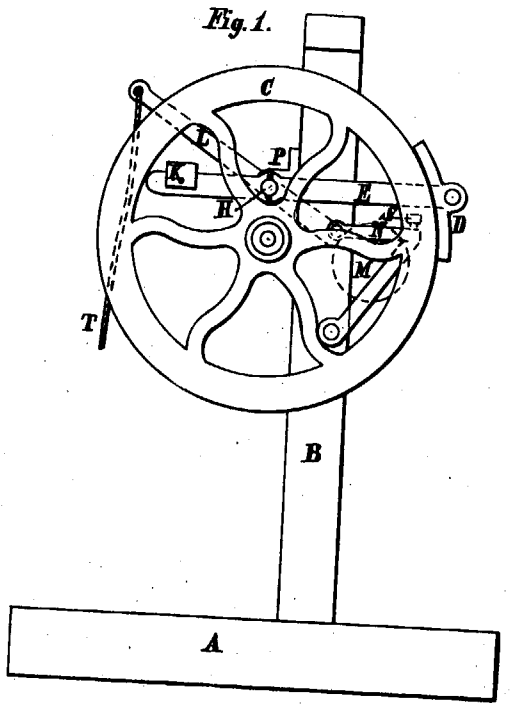
Attest;
Louis Cohen.
Geo. H. Procter.
Inventor;
Felix P. Canfield,
per Edw. Drummer, Atty.
N. PETERS, PHOTO-LITHOGRAPHER, WASHINGTON, D. C.

UNITED STATES PATENT OFFICE.

FELIX P. CANFIELD, OF BOSTON, MASSACHUSETTS.

BRAKE FOR ELEVATORS.

SPECIFICATION forming part of Reissued Letters Patent No. 9,584, dated February 22, 1881.

Original No. 134,640, dated January 7, 1873. Application for reissue filed December 23, 1880.

*To all whom it may concern:*

Be it known that I, FELIX P. CANFIELD, a citizen of the United States, residing at Boston, in the county of Suffolk and State of Massachusetts, have invented a new and useful Brake for Elevators, &c., of which the following is a specification, reference being had to the accompanying drawings.

My invention relates to a brake especially designed for a wheel for an elevator or hoisting device, but which may be employed in other machines where a brake operating in a similar manner is desirable.

My invention consists in an arm having a brake-shoe pivoted thereto to bear on a wheel, said arm being itself pivoted to swing about an axis eccentric to the axis of said wheel, so that when the brake-shoe is brought in contact with the wheel it will be caused to be carried by and with the wheel, moving in one direction, and to bear on the wheel with increased pressure, and thus a brake working automatically be established, and also so that on the reverse movement of the wheel the latter will be relieved of pressure by the brake-shoe and may revolve freely in that direction.

My invention further consists in said arm, when pivoted on an eccentric-pin, so that the brake-shoe may be moved from or caused to bear on the wheel by an endwise movement of the arm, produced by a complete or partial rotation of said eccentric-pin, an adjustable stop gaging the distance which said arm may swing.

In the drawings, Figures 1 and 2 are elevations, taken from opposite sides, of a device embodying my invention. Fig. 3 is a plan; and Fig. 4, an end view of the eccentric-pin upon which the brake-arm is pivoted, drawn on a larger scale.

The frame A B is adapted to support the several parts of the device, and may be of such form and construction as the elevator or other mechanism may require. The wheel C, having its bearings on the frame, is such as may be employed for an elevator or hoisting device. The brake-shoe D is pivoted to the brake-arm E, as shown. This brake-arm E is itself so pivoted as to swing about an axis eccentric to the axis of the wheel, and so that the brake-shoe may move a certain distance in the direction of the motion of the wheel, and then be brought to bear on the periphery of the wheel. The brake-arm E has a weight, K, to counterpoise the arm and the brake-shoe in whole or in part. The brake-arm E is furthermore pivoted on an eccentric-pin, H, at $h'$, said pin being set in a housing, P, to turn therein. An operating-lever, L, is fastened to the eccentric-pin H at $h$, having at one end a weight, M, and at the other end a rope or chain, T. The central part of the pin H, which is in the housing P, is eccentric to the part $h'$, on which the brake-arm E is pivoted, and to the part $h$, on which the operating-lever L is fastened. There is a screw, S, which I insert in a bracket, N, attached to the part B of the frame. This screw serves as a stop for the arm E to meet. This stop may be adjusted by screwing the same in the bracket N.

The device being constructed substantially as shown and described, when the arm E is brought in such position that the shoe D will touch the wheel while the wheel is in revolution in the direction to carry the brake-arm toward the stop S, the friction of the shoe on the wheel will be increased as the shoe is moved by and with the wheel, and the shoe will act as a brake on the wheel. This action is the result of pivoting the brake-arm on an axis eccentric to the axis of the wheel.

It will be seen that, the brake-shoe being in position to touch the wheel, an automatic brake will be established, always in condition to check and stop the motion of the wheel in one direction, while the wheel may revolve freely in the reverse direction.

The center on which the brake-arm is pivoted may be either within or outside of the circumference of the wheel, the essential condition being that the center of motion of the brake-arm shall be eccentric to that of the wheel.

The degree of pressure of the brake-shoe on the wheel is regulated, and the brake-shoe is brought in contact with and carried away from the wheel, by the employment of the eccentric-pin H. This pin is so set that when the lever L is left free—that is, not held by means of the rope T—the weight M will bring the lever L, and by the eccentric pin the arm E, into the position shown in Fig. 1, and hence move the brake-shoe against the wheel, and when the lever L is swung, by means of the rope T, into the position shown in Fig. 2, then the arm E, bearing on the stop S, will be moved endwise in the direction to move the brake-shoe away from the wheel, and the latter will be free to revolve. The brake may be allowed to come on the wheel to that extent which is required, and hence the wheel be stopped as gradually as desired, or allowed to revolve slowly, its motion being under absolute control by a slight strain on the rope T. The wheel will revolve more freely in the reverse direction by having the brake-shoe nearly or quite counterpoised by the weight K on the brake-arm.

I wish it to be particularly understood that there are in my device two prominent and distinct operations—one the movement of the brake-shoe by and with the wheel after it has been brought into such position as to touch the wheel, and with increasing pressure, so that an automatic brake is established, and also the automatic relieving the wheel, moving in the reverse direction, of pressure by the brake-shoe, and the other bringing the brake-shoe in contact with the wheel or carrying the shoe away from the wheel, thus regulating the pressure of the shoe on the wheel. The first operation is the result of pivoting the brake-arm on an axis outside of the axis of the wheel, and the second is effected by having the brake-arm pivoted on the eccentric-pin. The first operation would result, an automatic brake be established, and hence my invention, thus far, be involved, if a straight pin were employed in the place of the eccentric-pin, since the brake-arm would be pivoted outside of or eccentric to the axis of the wheel; but by the use of the eccentric-pin I am able, while providing means for the second operation, to obtain a nice regulation of the brake.

I claim as my invention—

1. A wheel having combined therewith a brake-arm bearing a brake-shoe, said brake-arm being pivoted to swing about an axis eccentric to the axis of the wheel, substantially as specified.

2. A wheel having combined therewith a brake-arm bearing a brake-shoe, when said brake-arm is pivoted on an eccentric-pin, substantially as specified.

3. The combination, with a wheel, of a brake-arm bearing a brake-shoe, and a stop, S, substantially as and for the purpose set forth.

4. The combination of the brake-arm E, eccentric H, and lever L, bearing a weight, M, substantially as described.

5. The combination of the brake-arm E, eccentric H, lever L, and stop S, substantially as described.

FELIX P. CANFIELD.

Witnesses:
EDW. DUMMER,
W. H. SOLOMON.